US012054967B2

(12) United States Patent
Lin

(10) Patent No.: US 12,054,967 B2
(45) Date of Patent: Aug. 6, 2024

(54) STRUCTURE COMPOSED OF LOCK CORE AND KEY

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 180 days.

(21) Appl. No.: 17/933,122

(22) Filed: Sep. 18, 2022

(65) Prior Publication Data

US 2023/0265681 A1 Aug. 24, 2023

(30) Foreign Application Priority Data

Feb. 18, 2022 (TW) ................................. 111106042

(51) Int. Cl.
*E05B 29/00* (2006.01)

(52) U.S. Cl.
CPC ................................ *E05B 29/0013* (2013.01)

(58) Field of Classification Search
CPC .... E05B 29/0013; E05B 21/003; E05B 29/00; Y10T 70/7695; Y10T 70/7514; Y10T 70/7531; Y10T 70/7537
USPC .................................. 70/349, 352, 355, 377
See application file for complete search history.

(56) References Cited

U.S. PATENT DOCUMENTS

2015/0247343 A1* 9/2015 Walls .................. E05B 63/0056 70/352

FOREIGN PATENT DOCUMENTS

CN 105735762 B * 11/2019 ......... E05B 17/2084
CN 114046096 A * 2/2022

* cited by examiner

*Primary Examiner* — Suzanne L Barrett

(57) ABSTRACT

The present invention provides a structure composed of lock core and key, which lock pieces may only shift in parallel, so as to avoid the lock pieces from rotating and to prevent the key sockets on the lock pieces from misaligning with one another due to random rotation of the lock pieces, which ensures easy and smooth key insertion and operation.

1 Claim, 9 Drawing Sheets

STRUCTURE COMPOSED OF LOCK CORE AND KEY

BACKGROUND OF THE PRESENT INVENTION

Field of Invention

The present invention relates to a structure composed of lock core and key, and, in particular, to a device that has each of the lock pieces shift in parallel, avoiding the lock pieces from rotating and avoiding the key socket from dislocation due to rotation, which facilitates key insertion and operation.

Description of Related Arts

It is noted that the lock core structure of a conventional laminated lock, referring to FIGS. 1 and 2, is mainly a lock core 1 composed of a lock core case 10, a lock piece seat 11, a detent element 12, multiple lock plates 13, multiple spacers 14, and a positioning piece 15, wherein the lock core case 10 has a room 100 arranged therein and a key insertion hole 102 arranged thereon, wherein the room 100 has a inlaying slot 101 arranged on the inner wall thereof, wherein the detent element 12 is embedded in the inlaying slot 101. The lock piece seat 11 is arranged in the room 100 of the lock core case 10. The lock piece seat 11 further has a cutting trough 110 and an opening 111. Part of the detent element 12 is embedded in the cutting trough 110 of the lock piece seat 11. Several lock plates 13 and spacers 14 are alternately arranged in the lock piece base. Each of the lock plates 13 has a key hole 130 arranged thereon. Each of the spacers 14 has a perforation 140 arranged thereon. Each of the lock plates 13 has a curvy recess 131 arranged on the outer edge thereof and each of the spacers 14 has a curvy recess 141 arranged on the outer edge thereof. The curvy recesses 131 and 141 are for the detent element 12 to be embedded and attached therewith. Each of the lock plates 13 also has a bulge 132 arranged on the outer edge thereof and each of the spacers 14 also has a flange 142 arranged on the outer edge thereof. Both the bulge 132 and the flange 142 are disposed within the opening 111 of the lock piece seat 11. The positioning piece 15 is arranged on an end of the lock piece seat 11 and within the room 100 of the lock core case 10. The positioning piece 15 has a key slot 150 arranged thereon. The key slot 150 has a convex body 151 arranged on two opposite long rims thereof respectively. Accordingly, this is the lock core structure of a laminated lock. One may insert a key 2 from the key insertion hole 102 of the lock core case 10 into the key slot 150 of the positioning piece 15 as well as the key holes 130 of the lock plates 13 in the lock piece seat 11 and the perforations 140 of the spacers 14, to align the guide troughs 20 provided on the key 2 with the convex elements 151 provided on the positioning piece 15. When the tooth troughs 21 arranged on two opposite walls of the key 2 are aligned with the positions of the lock plates 13 and the spacers 14, it can be turned and drive the lock piece seat 11 to rotate, so as to perform locking and unlocking. Unfortunately, a conventional laminated lock requires several lock plates 13 and several spacers 14 to be alternately laminated within the lock piece seat 11, which costs more time and efforts to produce and assemble because of numerous elements. In addition, the lock plates 13 arranged in the lock piece seat 11 of a conventional laminated lock may randomly rotate and become dislocated due to vibrations produced by a driving vehicle after the key has been removed, as illustrated in FIG. 2. As a result, the key holes 130 of the lock plates 13 will fail to stay aligned to one another. When one needs to insert the key 2 back into the key slots 150 and 130, he or she has to slightly shake the key 2 to guide and align the lock plates 13 in order to fully insert the key 2 into the lock piece seat 11 to turn the lock piece seat 11 for unlocking the lock. As a result, inserting the key 2 for locking or unlocking is troublesome and difficult and there is a reaming risk of the key hole 130 of the lock plates 13 under long term usage, which can render the key 2 fail to fit the lock plates 13 for unlocking the lock.

SUMMARY OF THE PRESENT INVENTION

A main object of the present invention is to provide a structure composed of lock core and key, which is capable of effectively overcoming the drawbacks of conventional lock cores and keys in manufacturing, assembling, and utilizing.

The structure composed of lock core and key comprises:

a lock core, comprising a lock core shell, a lock piece base, a plurality of compression springs, a positioning plate, a detent member, two springs, and a positioning buckle, jointly composing the lock core, wherein the lock core shell has a chamber provided therein and a key jack hole arranged thereon communicated with the chamber, wherein the chamber has an inlaying groove and a curvy groove vertically arranged on the inner wall thereof and a ring groove arranged thereon, wherein the lock piece base is arranged in the chamber of the lock core shell, wherein the lock piece base has a notch and a convex body vertically arranged on the surface thereof and a plurality of lock piece slots laterally arranged on the surface thereof penetrating the lock piece base, wherein the notch has a positioning recess arranged at the upper portion and the lower portion therein respectively, wherein each of the lock piece slots has an accommodating slot in an up and down alternate manner at a corresponding position at an end thereof, wherein the other end of each of the lock piece slots is connected and communicated with the notch, wherein the lock piece base further has a key socket arranged on an end surface thereof, connected and communicated with each of the lock piece slots, wherein the compression springs are arranged in the accommodating slots of the lock piece base respectively, wherein each two of the lock pieces are piled and arranged in the lock piece slots of the lock piece base respectively, wherein the lock pieces provide a key socket arranged therebetween respectively, wherein each of the lock pieces further has a positioning latch protrudingly arranged in each of the key sockets and a blocking body protrudingly arranged on a side edge thereof within the accommodating slots of the lock piece base respectively to block and retain the compression springs respectively, wherein each of the lock pieces also has a gap arranged on the other side edge thereof corresponding to the detent member, wherein the positioning plate is arranged on an end of the lock piece base and inserted into the chamber of the lock core shell, wherein the positioning plate has a key jack hole arranged thereon, wherein the key jack hole of the positioning plate has a convex body arranged on two opposite long rims respectively, wherein the detent member is arranged in the notch of the lock piece base, wherein the detent member has a positioning indentation arranged on the upper portion and lower portion of the inner side surface thereof respectively, wherein the two springs are correspondingly arranged in the two positioning indentations of the detent member and the two positioning indentations of the lock piece base respectively, wherein the positioning buckle is embedded in the ring groove of the lock core shell; and a key, adapted for being inserted into the lock core, wherein the key has a guide groove on two opposite side surfaces thereof respectively, wherein the guide grooves respectively have tooth dents arranged thereon at the positions corresponding to the positioning latch of the lock pieces of the lock core respectively.

Advantages of the structure composed of lock core and key according to the present invention include simple overall structure, easy and fast manufacturing and assembling, and mechanism that avoids dislocation due to rotation of the key socket of the lock pieces, which facilitates key insertion, allows stable turning, and greatly achieves an anti-theft function.

DETAILED DESCRIPTION OF THE PREFERRED EMBODIMENT

A preferred embodiment with drawings is provided in detail to illustrate a feasible technical means of the present invention in achieving the above and other uses and functions.

Figure 1:
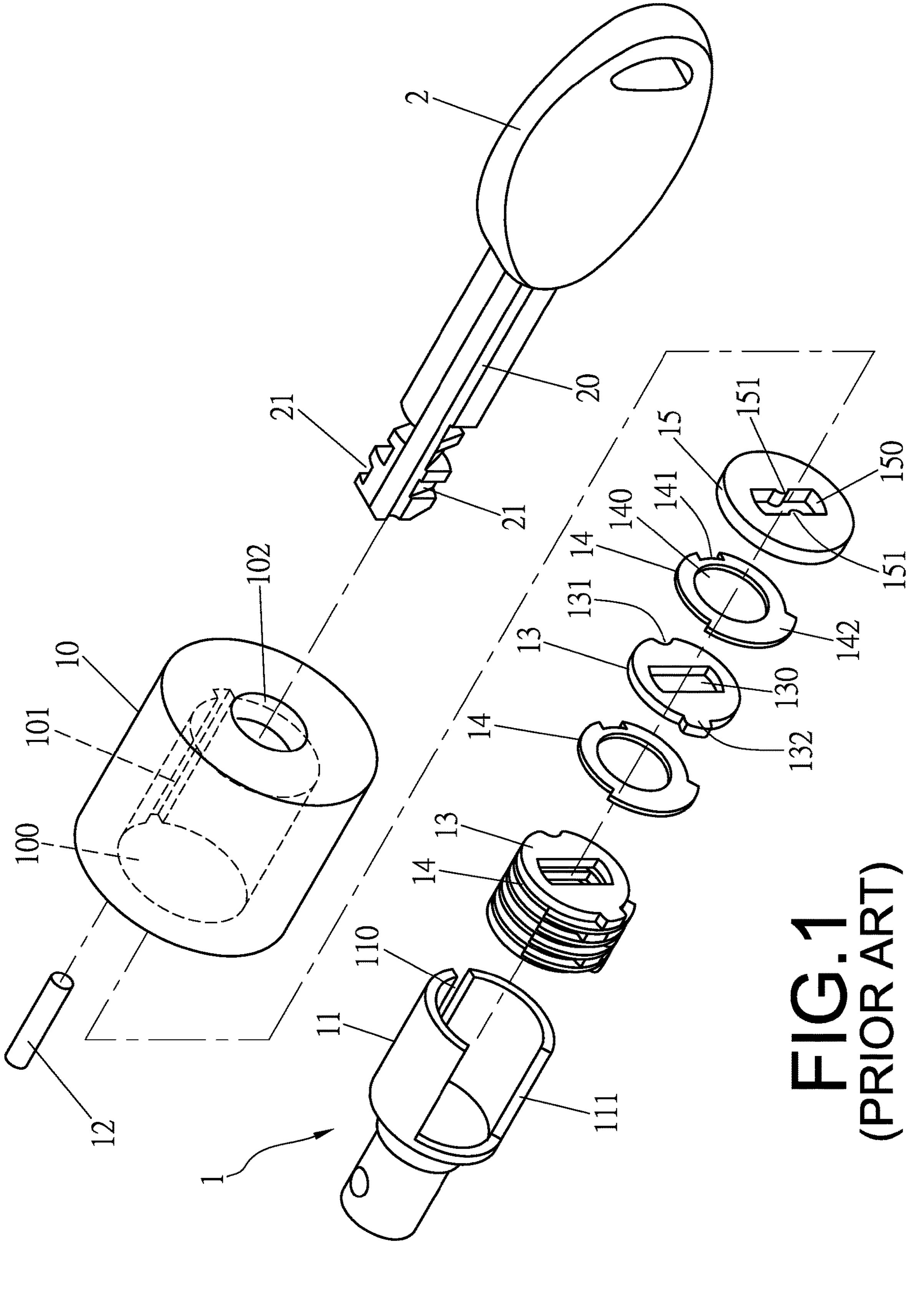
FIG.1 (PRIOR ART)
FIG. 1 is an exploded view of a lock core and key according to PRIOR ART.
Figure 2:
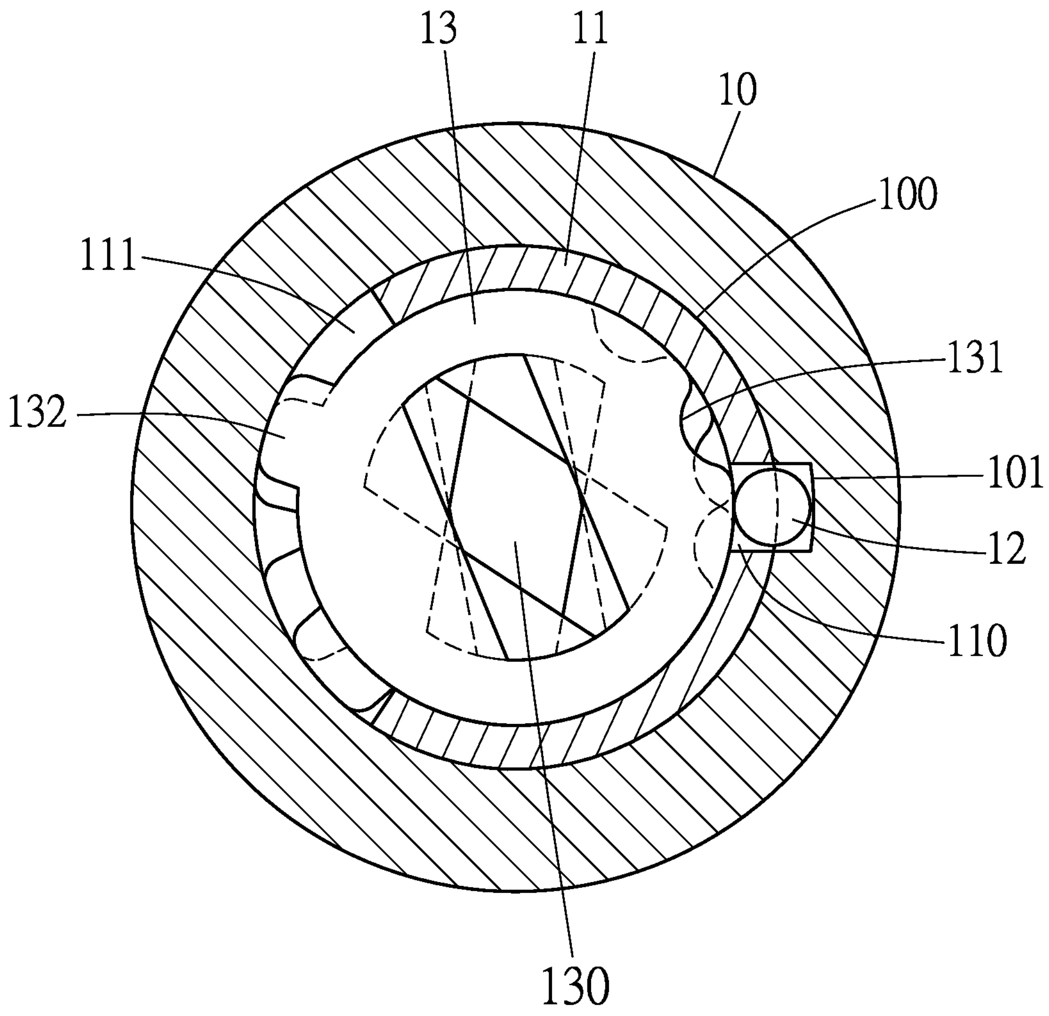
FIG.2 (PRIOR ART)
FIG. 2 is a sectional view of the structure of a lock core according to PRIOR ART.
Figure 3:
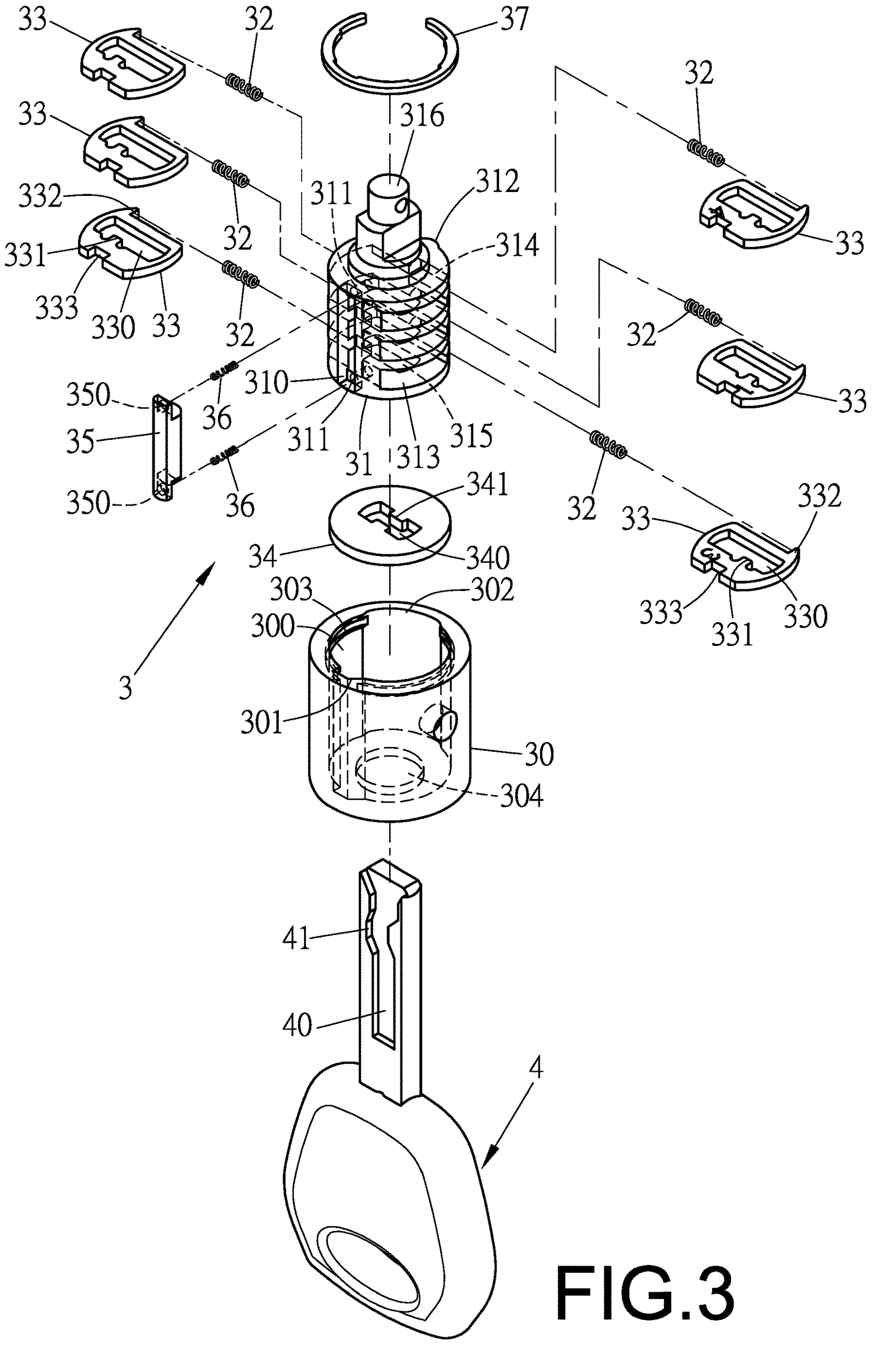
FIG. 3 is an exploded view of a lock core and key according to an embodiment of the present invention.
Figure 4:
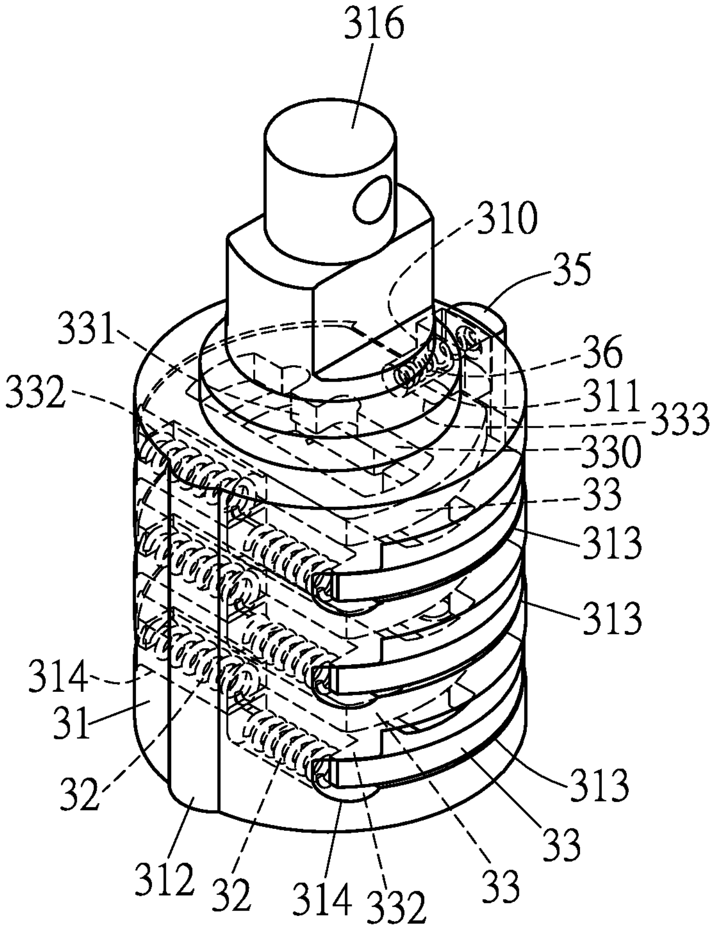
FIG. 4 is an assembling view of part of the structure of a lock core according to an embodiment of the present invention.

Referring to FIGS. 3 and 4, according to an embodiment of the present invention, a lock core 3 is mainly provided. The lock core 3 comprises a lock core shell 30, a lock piece base 31, a plurality of compression springs 32, a plurality of lock pieces 33, a positioning plate 34, a detent member 35, two springs 36, and a positioning buckle 37, jointly composing the lock core 3, wherein the lock core shell 30 has a chamber 300 provided therein and a key jack hole 304 arranged thereon communicated with the chamber 300, wherein the chamber 300 has an inlaying groove 301 and a curvy groove 302 vertically arranged on the inner wall thereof and a ring groove 303 arranged thereon in the chamber 300 of the lock core shell 30, wherein the lock piece base 31 is arranged in the chamber 300 of the lock core shell 30, wherein the lock piece base 31 has a notch 310 and a convex body 312 vertically arranged on the surface thereof and a plurality of lock piece slots 313 laterally arranged on the surface thereof penetrating the lock piece base 31, wherein the notch 310 has a positioning recess 311 arranged at the upper portion and the lower portion therein respectively, wherein each of the lock piece slots 313 has an accommodating slot 314 in an up and down alternate manner at a corresponding position at an end thereof, wherein the other end of each of the lock piece slots 313 is connected and communicated with the notch 310, wherein the lock piece base 31 further has a key socket hole 315 arranged on another an end surface thereof, connected and communicated with each of the lock piece slots 313, wherein the lock piece base 31 further has a linked swivel 316 protrudingly arranged on the other end thereof. The compression springs 32 are arranged in the accommodating slots 314 of the lock piece base 31 respectively, wherein each two of the lock pieces 33 are piled and arranged in the lock piece slots 313 of the lock piece base 31 respectively, wherein the lock pieces 33 provide a key socket 330 arranged therebetween respectively, wherein each of the lock pieces 33 further has a positioning latch 331 protrudingly arranged in each of the key sockets 330 and a blocking body 332 protrudingly arranged on a side edge thereof within the accommodating slots 314 of the lock piece base 31 respectively to block and retain the compression springs 32 respectively, wherein each of the lock pieces 33 also has a gap 333 arranged on the other side edge thereof, wherein the positioning plate 34 is arranged on an end of the lock piece base 31 and inserted into the chamber 300 of the lock core shell 30, wherein the positioning plate 34 has a key jack hole 340 arranged thereon, wherein the key jack hole 340 has a convex body 341 arranged on two opposite long rims respectively, wherein the detent member 35 is arranged in the notch 310 of the lock piece base 31, wherein the detent member 35 has a positioning indentation 350 arranged on the upper portion and lower portion of the inner side surface thereof respectively, wherein the two springs 36 are correspondingly arranged in the two positioning indentations 350 of the detent member 35 and the two positioning recesses 311 of the lock piece base 31 respectively, wherein the positioning buckle 37 is embedded in the ring groove 303 of the lock core shell 30. a key 4, adapted for being inserted into the key socket of the lock core 3, wherein the key 4 has a guide groove 40 on two opposite side surfaces thereof respectively, wherein the guide grooves 40 respectively have tooth dents 41 arranged thereon at the positions corresponding to the positioning latch 331 of the lock pieces 33 of the lock core 3 respectively. Accordingly, a structure composed of lock core and key is provided.

To assemble the lock core 3 of the present invention, referring to FIGS. 3~6, the compression springs 32 are respectively installed into the accommodating slots 314 of the lock piece base 31 and each two of the lock pieces 33 are disposed in an opposite manner and inserted into a lock piece slot 313 of the lock piece base 31, to have each two of the lock pieces 33 overlapped with each other and put in one of the lock piece slots 313 and have the blocking bodies 332 of the lock pieces 33 disposed in the accommodating slot 314 of the lock piece base 31 to block and retain the compression springs 32, rendering the gaps 333 of the lock pieces 33 be aligned with one another. An end of the two springs 36 are respectively inserted into the two positioning recesses 311 of the lock piece base 31 and the inner side of the detent member 35 is inserted into the notch 310 of the lock piece base 31 and the gaps 333 of the lock pieces 33. Then, the other end of the two springs 36 are respectively inserted into the two positioning indentations 350 of the detent member 35, so as to utilize the two springs 36 to resiliently push the detent member 35. Then the positioning plate 34 is inserted into the chamber 300 of the lock core shell 30 and the assembled lock piece base 31 with the lock pieces 33, compression springs 32, detent member 35, and two springs 36, as mentioned above, is jointly put into the chamber 300 of the lock core shell 30, to align the outer portion of the detent member 35 to the position of the inlaying groove 301 of the lock core shell 30. After the lock piece base 31 was inserted into the lock core shell 30, the two springs 36 will push the detent member 35 outward, so as to have the inner portion of the detent member 35 escape from the gaps 333 of the lock pieces 33, while the outer portion of the detent member 35 is still embedded in the inlaying groove 301 of the lock core shell 30. As this moment, the lock pieces 33 will be pushed to horizontally shift due to the resilience of the compression spring 32. The convex body 312 of the lock piece base 31 is disposed in the curvy groove 302 of the lock core shell 30. Then the positioning buckle 37 is disposed in the ring groove 303 of the lock core shell 30, so as to further position the elements of the lock piece base 31 in the chamber 300 of the lock core shell 30. Accordingly, the general assembling of the lock core is completed. The lock core 3 according to the present invention does not require multiple gaskets as a conventional laminated lock does, therefore greatly saving parts in the producing and assembling processes, simplifying the overall structure, and making the general assembling easy and fast.

Figure 5:
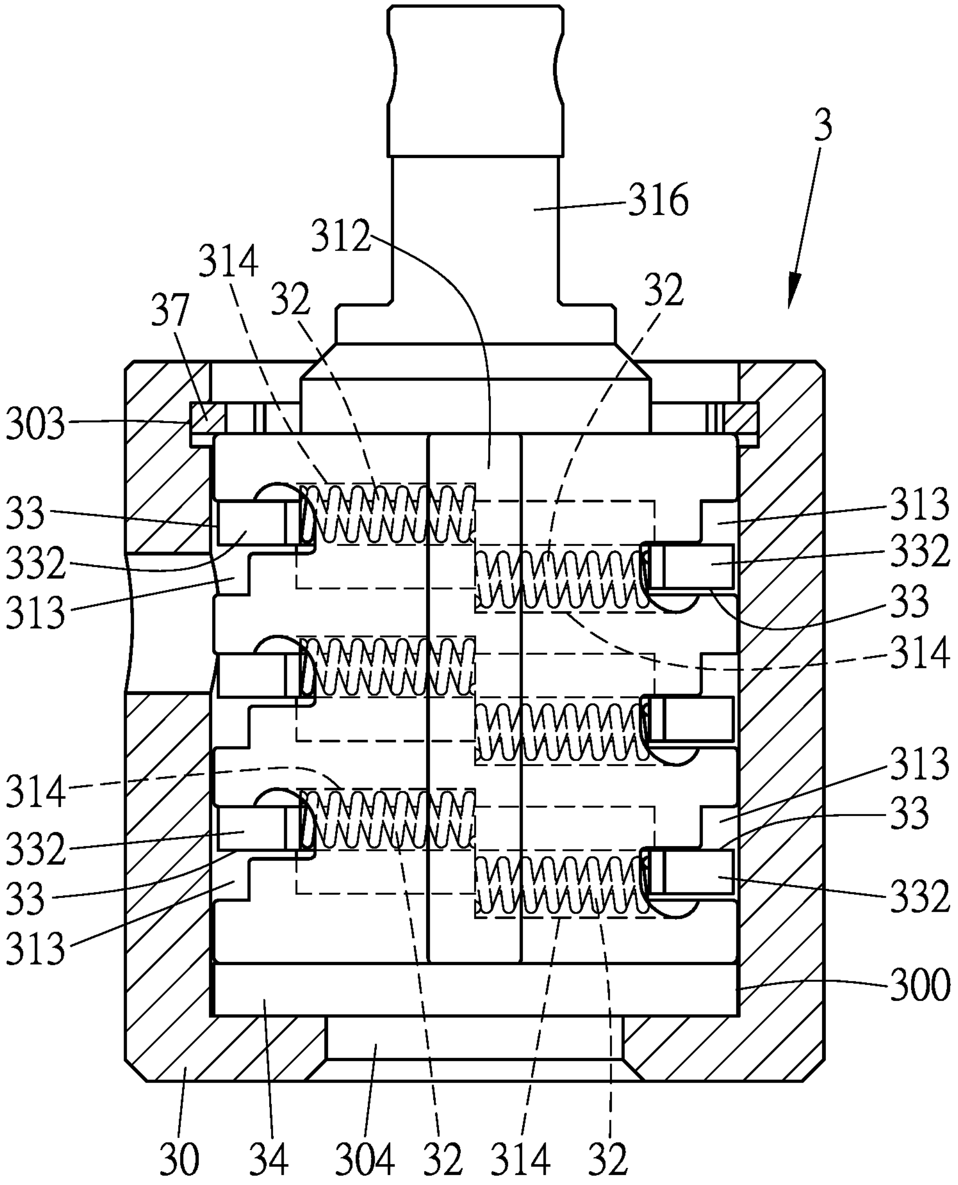
FIG. 5 is a sectional view of the assembled lock core according to an embodiment of the present invention.
Figure 6:
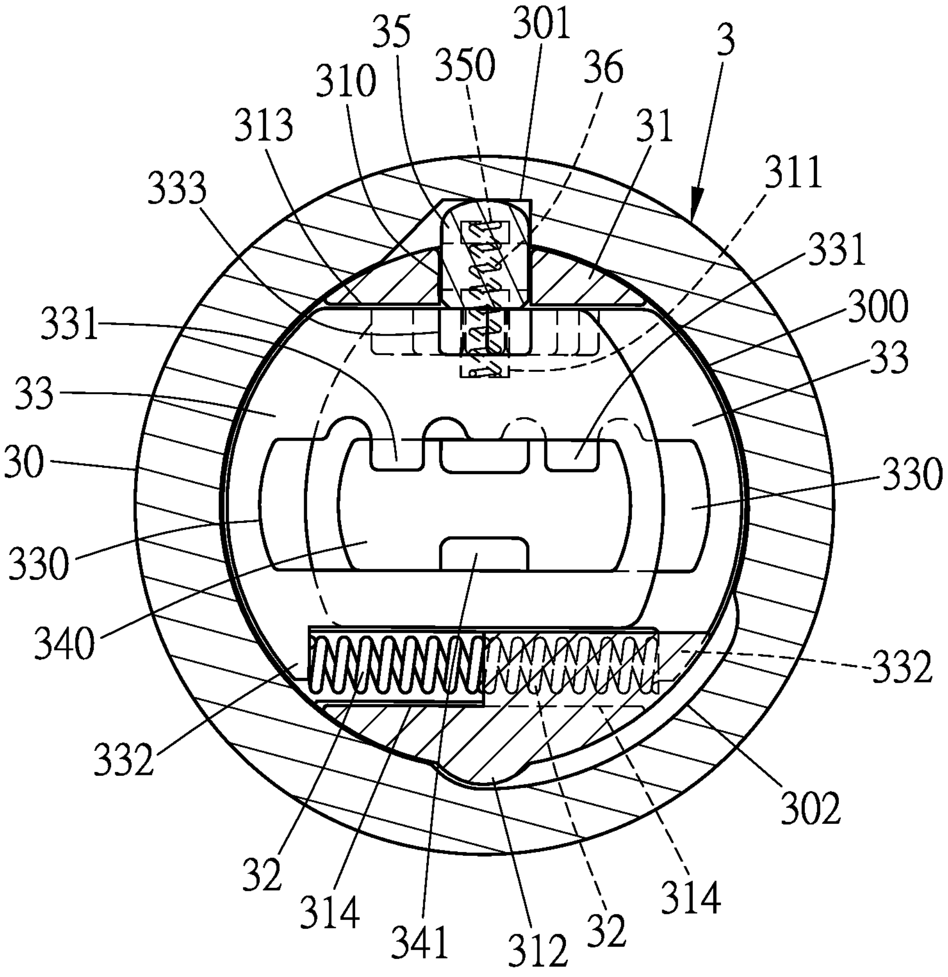
FIG. 6 is a sectional view of a lock core in a locked mode according to an embodiment of the present invention.
Figure 7:
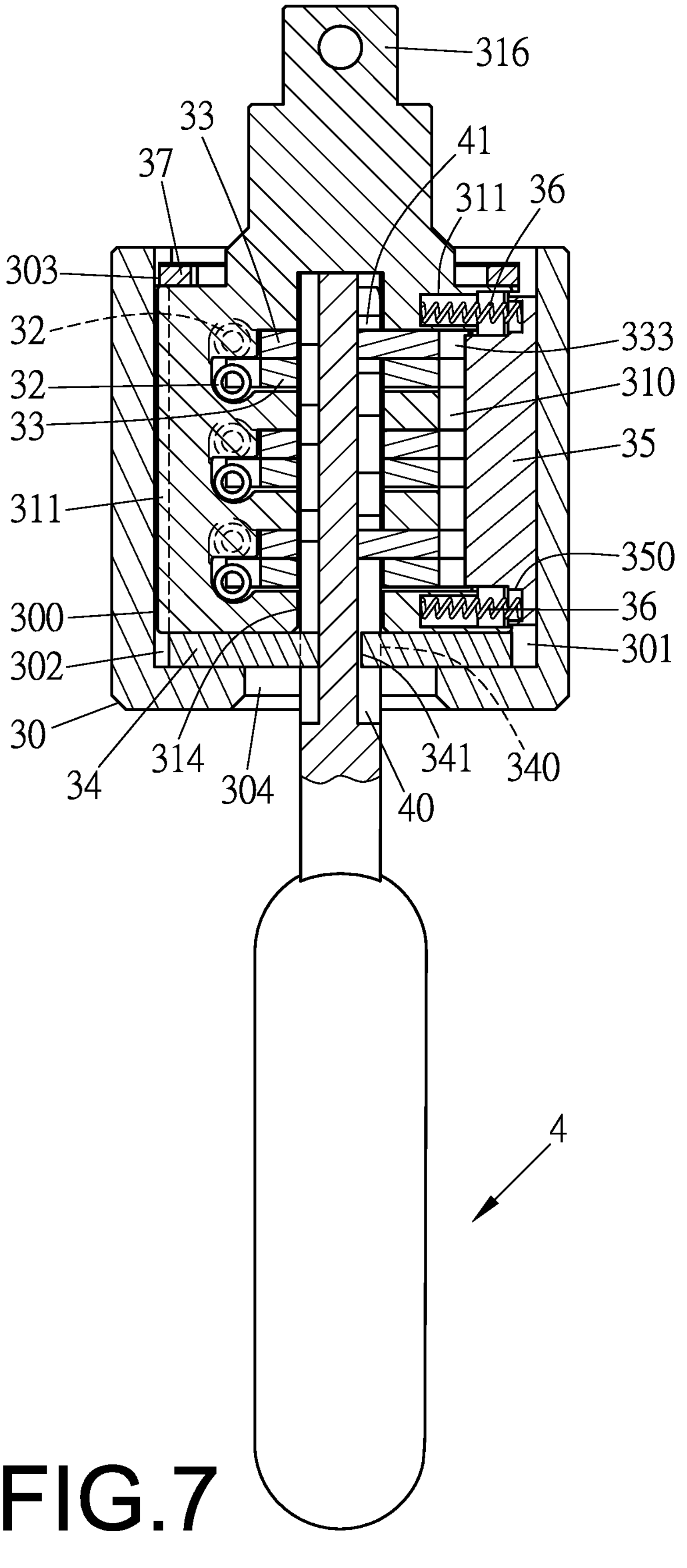
FIG. 7 is a sectional perspective view of a key inserted into a lock core according to an embodiment of the present invention.
Figure 8:
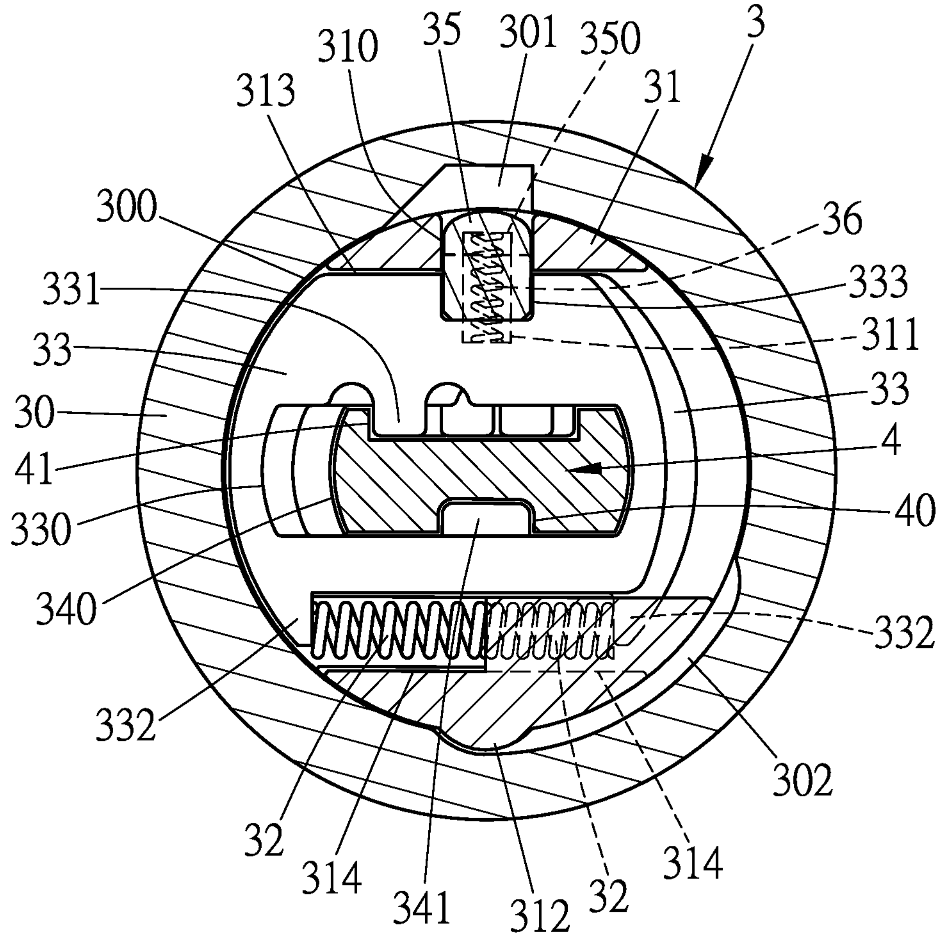
FIG. 8 is a sectional view of a key inserted into a lock core according to an embodiment of the present invention.
Figure 9:
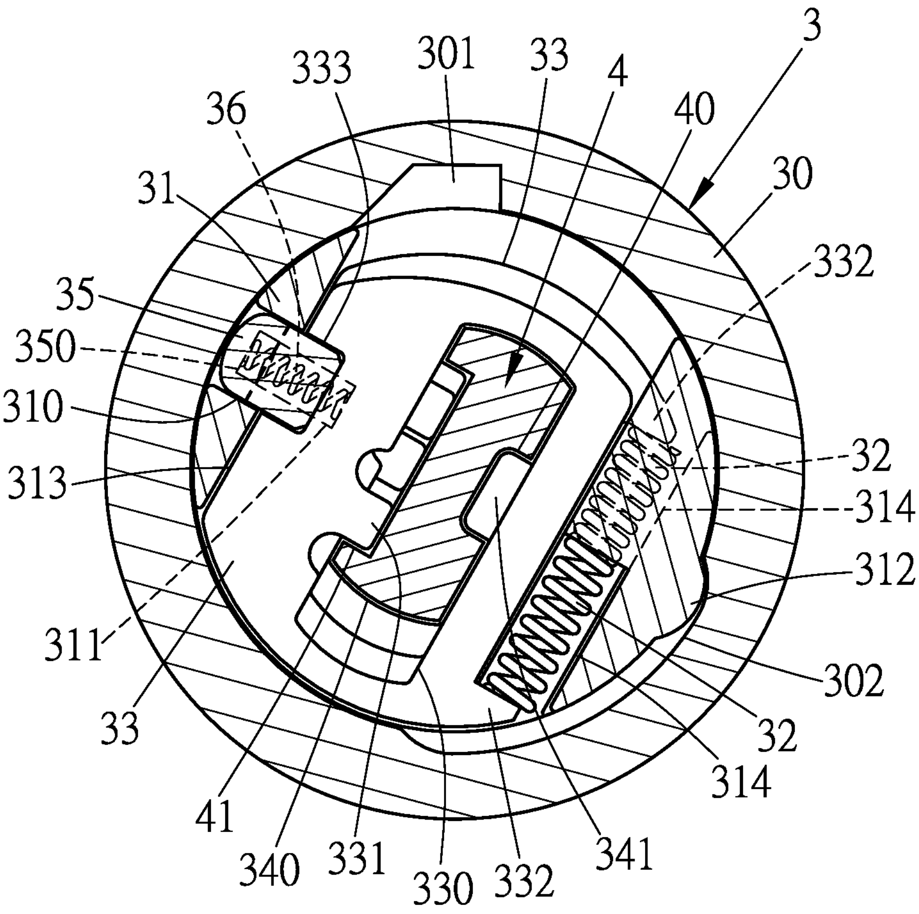
FIG. 9 is a sectional perspective view of a lock piece base being rotated according to an embodiment of the present invention.

The lock core 3 of the present invention is capable of being assembled on various locks. Also, a way to utilize the lock core 3 and the key 4 according to the present invention may refer to FIGS. 5-9. To unlock the lock, one may insert the key 4 into the key jack hole 304 of the lock core shell 30 and into the key sockets 330 of the lock pieces 33 in the lock piece base 31 through the key jack hole 340 of the positioning plate 34. The key 4 is guided through the coordination of the guide grooves 40 and the convex body 341 of the positioning plate 34, so that the key 4 can stably stay inserted in the lock core 3 without shaking. When the key 4 is inserted into the key sockets 330 of the lock pieces 33, the tooth dents 41 of the key 4 will be corresponding to the positioning latches 331 of the lock pieces 33, so as to push the lock pieces 33 to horizontally shift, as illustrated in FIGS. 7 and 8. The blocking bodies 332 of the horizontally shifted lock pieces 33 will abut the compression springs 32, so as to turn the compression springs 32 into a compression mode and to align the gaps 333 of the lock pieces 33. Then, the gaps 333 are aligned to the position of the notch 310 of the lock piece base 31, so as to turn the inner portion of the detent member 35 into the gaps 333. In this way, the key 4 can be turned to drive the lock piece base 31 to rotate, as illustrated in FIG. 9. The outer portion of the detent member 35 can be withdrawn into the notch 310 of the lock piece base 31. The retraction of the detent member 35 will press the two springs into a compression mode. The detent member 35 will rotate along with the lock piece base 31 so as to escape from embedding in the inlaying groove 301 of the lock core shell 30, so that the detent member 35 is turned away from the position of the inlaying groove 301 of the lock core shell 30, so as to finish the unlocking operation. When the lock is unlocked and about to be restored to remove the key 4 or to be locked again, it only has to utilize the key 4 to restore the lock piece base 31, so as to align the detent member 35 back to the position of the inlaying groove 301 of the lock core shell 30. Here, the two springs 36 are restored resiliently to push the detent member 35 outward, so as to embed the outer portion of the detent member 35 back to the inlaying groove 301 of the lock core shell 30 again. Then the key 4 is withdrawn from the lock core 3, as FIGS. 5 and 6 illustrated. After the key 4 is withdrawn, the lock pieces 33 in the lock piece base 31 are no longer pushed and limited by the key 4 and the blocking bodies 332 of the lock pieces 33 are pushed back to the original positions through the resiliently restored compression springs 32, so as to finish the act of locking. The present invention utilizes a structure that overlap two lock pieces 33 to assemble into one lock piece slot 312 of the lock piece base 31 in order to ensure that the lock pieces 33 only shift horizontally rather than rotate around, so as to solve the drawback of the conventional lock core structure that the internal lock plates may rotate after the key is removed. Besides, the detent member 35 embedded in the inlaying groove 301 of the lock core shell 30 also strengthens and stabilizes the locking of the lock core 3. According to the present invention, the key sockets 330 of the lock pieces 33 arranged in the lock core 3 will not randomly rotate or become dislocated, so that the key 4 can easily and smoothly be inserted into the key sockets 330 of the lock pieces 33 again to operate the lock.

In summary, the present invention has achieved the expected objects and effects, and is more ideal and practical than prior art. However, the above-mentioned embodiments are only for specifically describing the preferred embodiments of the present invention, and the embodiments are not intended to limit the scope of the present application. Also, other equivalent changes and modifications made without departing from the technical means disclosed in the present invention are intended to be included in the patent scope of the present invention.

The present invention provides a structure composed of lock core and key, which lock pieces may only shift in parallel, so as to avoid the lock pieces from rotating and to prevent the key sockets on the lock pieces from misaligning with one another due to random rotation of the lock pieces, which ensures easy and smooth key insertion and operation.

What is claimed is:

1. A structure composed of lock core and key, comprising:

a lock core, comprising a lock core shell, a lock piece base, a plurality of compression springs, a positioning plate, a detent member, two springs, and a positioning buckle, jointly composing said lock core, wherein said lock core shell has a chamber provided therein and a key jack hole arranged thereon communicated with said chamber, wherein said chamber has an inlaying groove and a curvy groove vertically arranged on the inner wall thereof and a ring groove arranged thereon, wherein said lock piece base is arranged in said chamber of said lock core shell, wherein said lock piece base has a notch and a convex body vertically arranged on the surface thereof and a plurality of lock piece slots laterally arranged on the surface thereof penetrating said lock piece base, wherein said notch has a positioning recess arranged at the upper portion and the lower portion therein respectively, wherein each of said lock piece slots has an accommodating slot in an up and down alternate manner at a corresponding position at an end thereof, wherein the other end of each of said lock piece slots is connected and communicated with said notch, wherein said lock piece base further has a key socket arranged on an end surface thereof, connected and communicated with each of said lock piece slots, wherein said compression springs are arranged in said accommodating slots of said lock piece base respectively, wherein each two of said lock pieces are piled and arranged in said lock piece slots of said lock piece base respectively, wherein said lock pieces provide a key socket arranged therebetween respectively, wherein each of said lock pieces further has a positioning latch protrudingly arranged in each of said key sockets and a blocking body protrudingly arranged on a side edge thereof within said accommodating slots of said lock piece base respectively to block and retain said compression springs respectively, wherein each of said lock pieces also has a gap arranged on the other side edge thereof corresponding to said detent member, wherein said positioning plate is arranged on an end of said lock piece base and inserted into said chamber of said lock core shell, wherein said positioning plate has a key jack hole arranged thereon, wherein said key jack hole of said positioning plate has a convex body arranged on two opposite long rims respectively, wherein said detent member is arranged in said notch of said lock piece base, wherein said detent member has a positioning indentation arranged on the upper portion and lower portion of the inner side surface thereof respectively, wherein said two springs are correspondingly arranged in said two positioning indentations of said detent member and said two positioning recesses of said lock piece base respectively, wherein said positioning buckle is embedded in said ring groove of said lock core shell; and a key, adapted for being inserted into said lock core, wherein said key has a guide groove on two opposite side surfaces thereof respectively, wherein said guide grooves respectively have tooth dents arranged thereon at the positions corresponding to said positioning latch of said lock pieces of said lock core respectively.

* * * * *